(12) United States Patent
Wang et al.

(10) Patent No.: US 12,297,303 B2
(45) Date of Patent: May 13, 2025

(54) HIGH PRODUCTIVITY POLYMERIZATION WITH ARYLOXY ETHER LIGAND CATALYST

(71) Applicant: NOVA Chemicals (International) S.A., Fribourg (CH)

(72) Inventors: Qinyan Wang, Pittsburgh, PA (US); Cheng Fan, Calgary (CA); Peter Zoricak, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 649 days.

(21) Appl. No.: 17/764,767

(22) PCT Filed: Sep. 28, 2020

(86) PCT No.: PCT/IB2020/059052
§ 371 (c)(1),
(2) Date: Mar. 29, 2022

(87) PCT Pub. No.: WO2021/064546
PCT Pub. Date: Apr. 8, 2021

(65) Prior Publication Data
US 2022/0340699 A1    Oct. 27, 2022

Related U.S. Application Data

(60) Provisional application No. 62/908,738, filed on Oct. 1, 2019.

(51) Int. Cl.
| | | |
|---|---|---|
| *C08F 4/64* | (2006.01) | |
| *C08F 2/06* | (2006.01) | |
| *C08F 4/52* | (2006.01) | |
| *C08F 4/6592* | (2006.01) | |
| *C08F 4/76* | (2006.01) | |
| *C08F 210/16* | (2006.01) | |
| *C08F 2/04* | (2006.01) | |

(52) U.S. Cl.
CPC ............. *C08F 210/16* (2013.01); *C08F 2/06* (2013.01); *C08F 4/64193* (2013.01); *C08F 4/65925* (2013.01); *C08F 2/04* (2013.01); *C08F 4/64* (2013.01)

(58) Field of Classification Search
CPC ........ C08F 4/64193; C08F 4/64; C08F 210/16
See application file for complete search history.

(56) References Cited

U.S. PATENT DOCUMENTS

| | | | |
|---|---|---|---|
| 5,064,802 A | 11/1991 | Stevens et al. | |
| 5,198,401 A | 3/1993 | Turner et al. | |
| 5,589,555 A | 12/1996 | Zboril et al. | |
| 6,103,657 A | 8/2000 | Murray | |
| 8,088,704 B2 * | 1/2012 | Kolb | C08F 10/00 502/103 |
| 8,202,953 B2 * | 6/2012 | Konze | C08F 10/00 526/170 |
| 8,420,760 B2 * | 4/2013 | Hughes | C08F 210/16 526/348 |
| 8,629,214 B2 * | 1/2014 | Karjala | C08L 23/06 525/240 |
| 8,722,817 B2 * | 5/2014 | Karjala | C08F 210/16 526/138 |
| 8,829,115 B2 * | 9/2014 | Hermel-Davidock | C08L 23/04 526/348 |
| 9,527,940 B2 * | 12/2016 | Demirors | C08F 210/16 |
| 9,527,941 B2 * | 12/2016 | Demirors | C08F 210/16 |
| 10,239,974 B2 * | 3/2019 | Kapur | C08F 210/16 |
| 10,351,646 B2 * | 7/2019 | Fontaine | C08F 210/16 |
| 10,526,431 B2 * | 1/2020 | Fontaine | C08F 210/16 |
| 10,597,473 B2 * | 3/2020 | Figueroa | C08F 210/16 |
| 10,647,797 B2 * | 5/2020 | Fontaine | C08F 210/16 |
| 2010/0311927 A1 * | 12/2010 | Karjala | C08F 10/02 526/170 |
| 2011/0003940 A1 * | 1/2011 | Karjala | C08J 5/18 526/348.4 |
| 2015/0337062 A1 * | 11/2015 | Demirors | C08F 210/16 526/132 |
| 2015/0344601 A1 * | 12/2015 | Demirors | C08F 210/16 526/348.2 |

FOREIGN PATENT DOCUMENTS

| | | |
|---|---|---|
| WO | WO-2014/105414 A1 | 7/2014 |
| WO | WO-2018/063693 A1 | 4/2018 |
| WO | WO-2018/193375 A1 | 10/2018 |

OTHER PUBLICATIONS

International Search Report and Written Opinion corresponding to PCT/IB2020/059052, dated Jan. 12, 2021, 10 pages.

* cited by examiner

*Primary Examiner* — Rip A Lee
(74) *Attorney, Agent, or Firm* — Thomas J. Styslinger

(57) ABSTRACT

The copolymerization of ethylene with an optional comonomer is conducted in the presence of a catalyst having a specific aryloxy ether ligand structure. The process enables very high conversions of ethylene to polyethylene at very short residence times when conducted under conditions of pressures of at least 10.3 MPa and high ethylene feed concentrations of from 70 to 150 grams per liter.

8 Claims, No Drawings

HIGH PRODUCTIVITY POLYMERIZATION WITH ARYLOXY ETHER LIGAND CATALYST

CROSS-REFERENCE TO RELATED PATENT APPLICATIONS

This application is a U.S. National Phase Application under 35 U.S.C. § 371 of International Application No. PCT/IB2020/059052, filed Sep. 28, 2020, which claims the benefit of priority to U.S. Provisional Patent Application No. 62/908,738, filed on Oct. 1, 2019, both of which are incorporated herein by reference in their entirety.

The polymerization of ethylene under solution conditions is a well known art in which ethylene and an optional comonomer are contacted in the presence of catalyst in a solvent for the monomer(s) and the resulting polymer. It will be recognized by those skilled in the art that it is desirable to conduct solution polymerizations at elevated temperatures because this reduces the viscosity of the polymer solution (which can enable higher polymer concentrations) and because the higher polymerization temperature reduces the amount of energy that is needed to recover the polymer from the solution. It will also be recognized that it is difficult to operate at high temperatures because most of the common coordination catalysts quickly deactivate at temperatures in excess of 150° C.

The productivity of a solution polymerization process is also influenced by the reaction time (or "Hold Up Time") that is required to achieve a target rate of ethylene conversion (i.e. ethylene to polyethylene). A short residence time with high conversion provides high productivity. We have now discovered a highly productive process for the (co)polymerization of ethylene using a specified catalyst under conditions of relatively high pressure and ethylene feed concentration.

In an embodiment, the present disclosure provides a process for the (co)polymerization of ethylene and, optionally, at least one alpha olefin comonomer wherein said process is conducted under solution polymerization conditions using a catalyst system including:

A) a catalyst defined by the formula:

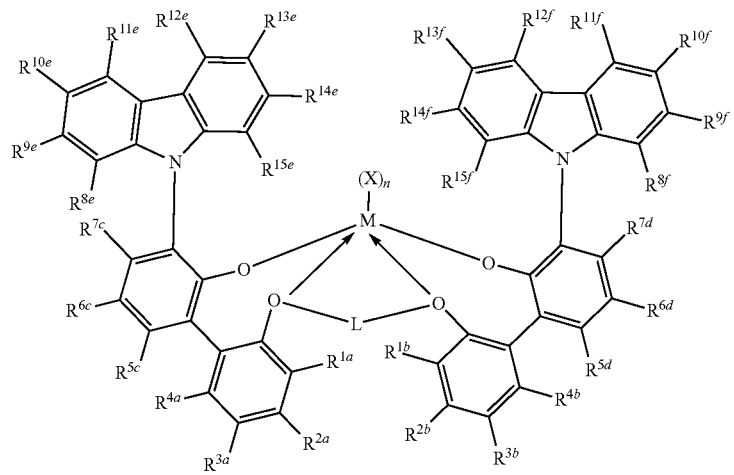

M is titanium, zirconium, or hafnium, each independently being in a formal oxidation state of +2, +3, or +4;

n is an integer of from 0 to 3, wherein when n is 0, X is absent;

Each X independently is a monodentate ligand that is neutral, monoanionic, or dianionic; or two X are taken together to form a bidentate ligand that is neutral, monoanionic, or dianionic;

X and n are chosen in such a way that the metal-ligand complex of formula (I) is, overall, neutral;

L is hydrocarbylene or heterohydrocarbylene, wherein the hydrocarbylene has a portion that includes a 1-carbon atom to 6-carbon atom linker backbone linking the O atoms in formula (I) and the heterohydrocarbylene has a portion that includes a 1-atom to 6-atom linker backbone linking the O atoms in formula (I), wherein each atom of the 1-atom to 6-atom linker backbone of the heterohydrocarbylene independently is a carbon atom or a heteroatom, wherein each heteroatom independently is O, S, S(O), S(O)$_2$, Si(R$^C$)$_2$, Ge(R$^C$)$_2$, P(R$^P$), or N(R$^N$), wherein independently each R$^C$ is unsubstituted (C1-C18)hydrocarbyl or the two R$^C$ are taken together to form a (C2-C19)alkylene, each R$^P$ is unsubstituted (C1-C18)hydrocarbyl; and each R$^N$ is unsubstituted (C1-C18)hydrocarbyl, a hydrogen atom or absent;

Each of R$^{1a}$, R$^{1b}$, R$^{2a}$, R$^{2b}$, R$^{3a}$, R$^{3b}$, R$^{4a}$, R$^{4b}$, R$^{5b}$, R$^{5d}$, R$^{6c}$, R$^{6d}$, R$^{7c}$, R$^{7d}$, R$^{8e}$, R$^{8f}$, R$^{9e}$, R$^{9f}$, R$^{10e}$, R$^{10f}$, R$^{11e}$, R$^{11f}$, R$^{12e}$, R$^{12f}$, R$^{13e}$, R$^{13f}$, R$^{14e}$, R$^{14f}$, R$^{15e}$, R$^{15f}$ independently is a hydrogen atom; hydrocarbyl; heterohydrocarbyl; or halogen atom;

B) and an activator, wherein said solution polymerization is conducted under the following conditions:

1) an ethylene feed concentration of from 70 to 150 grams per liter of solvent;
2) a pressure of from 10.3 to 31 MPa; and
3) a reactor residence time of from 0.5 to 5 minutes, with the proviso that from 50 to 95 weight % of the ethylene in said feed is polymerized within said residence time of from 0.5 to 5 minutes.

Other than in the examples or where otherwise indicated, all numbers or expressions referring to quantities of ingredients, extrusion conditions, etc., used in the specification and claims are to be understood as modified in all instances by the term 'about'. Accordingly, unless indicated to the contrary, the numerical parameters set forth in the following specification and attached claims are approximations that can vary depending upon the desired properties that the various embodiments desire to obtain. At the very least, and not as an attempt to limit the application of the doctrine of equivalents to the scope of the claims, each numerical parameter should at least be construed in light of the number of reported significant digits and by applying ordinary rounding techniques. The numerical values set forth in the specific examples are reported as precisely as possible. Any numerical values, however, inherently contain certain errors necessarily resulting from the standard deviation found in their respective testing measurements.

It should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

All compositional ranges expressed herein are limited in total to and do not exceed 100 percent (volume percent or weight percent) in practice. Where multiple components can be present in a composition, the sum of the maximum amounts of each component can exceed 100 percent, with the understanding that, and as those skilled in the art readily understand, that the amounts of the components actually used will conform to the maximum of 100 percent.

In order to form a more complete understanding of this disclosure the following terms are defined and should be used with the accompanying figures and the description of the various embodiments throughout.

As used herein, the terms "monomer" "comonomer" refer to a small molecule that may chemically react and become chemically bonded with itself or other monomers to form a polymer.

As used herein, the term "α-olefin" is used to describe a monomer having a linear hydrocarbon chain containing from 3 to 20 carbon atoms having a double bond at one end of the chain; an equivalent term is "linear α-olefin".

As used herein, the terms "ethylene polymer" and "polyethylene", refer to macromolecules produced from ethylene and optionally one or more additional monomers; regardless of the specific catalyst or specific process used to make the ethylene polymer. In the polyethylene art, the one or more additional monomers are frequently called "comonomer(s)" and often include α-olefins. The term "homopolymer" refers to a polymer that contains only one type of monomer. Common ethylene polymers include high density polyethylene (HDPE), medium density polyethylene (MDPE), linear low density polyethylene (LLDPE), very low density polyethylene (VLDPE), ultralow density polyethylene (ULDPE), plastomer and elastomers.

The term "thermoplastic" refers to a polymer that becomes liquid when heated, will flow under pressure and solidify when cooled. Thermoplastic polymers include ethylene polymers as well as other polymers used in the plastic industry; non-limiting examples of other polymers commonly used in film applications include barrier resins (EVOH), tie resins, polyethylene terephthalate (PET), polyamides and the like.

As used herein the term "monolayer film" refers to a film containing a single layer of one or more thermoplastics.

As used herein, the terms "hydrocarbyl", "hydrocarbyl radical" or "hydrocarbyl group" refers to linear, branched, or cyclic, aliphatic, olefinic, acetylenic and aryl (aromatic) radicals including hydrogen and carbon that are deficient by one hydrogen.

As used herein, an "alkyl radical" includes linear, branched and cyclic paraffin radicals that are deficient by one hydrogen radical; non-limiting examples include methyl ($—CH_3$) and ethyl ($—CH_2CH_3$) radicals. The term "alkenyl radical" refers to linear, branched and cyclic hydrocarbons containing at least one carbon-carbon double bond that is deficient by one hydrogen radical.

As used herein, the term "aryl" group includes phenyl, naphthyl, pyridyl and other radicals whose molecules have an aromatic ring structure; non-limiting examples include naphthylene, phenanthrene and anthracene. An "arylalkyl" group is an alkyl group having an aryl group pendant there from; non-limiting examples include benzyl, phenethyl and tolylmethyl; an "alkylaryl" is an aryl group having one or more alkyl groups pendant there from; non-limiting examples include tolyl, xylyl, mesityl and cumyl.

As used herein, the phrase "heteroatom" includes any atom other than carbon and hydrogen that can be bound to carbon. A "heteroatom-containing group" is a hydrocarbon radical that contains a heteroatom and may contain one or more of the same or different heteroatoms. In one embodiment, a heteroatom-containing group is a hydrocarbyl group containing from 1 to 3 atoms chosen from boron, aluminum, silicon, germanium, nitrogen, phosphorous, oxygen and sulfur. Non-limiting examples of heteroatom-containing groups include radicals of imines, amines, oxides, phosphines, ethers, ketones, oxoazolines heterocyclics, oxazolines, thioethers, and the like. The term "heterocyclic" refers to ring systems having a carbon backbone that include from 1 to 3 atoms chosen from boron, aluminum, silicon, germanium, nitrogen, phosphorous, oxygen and sulfur.

As used herein the term "unsubstituted" means that hydrogen radicals are bounded to the molecular group that follows the term unsubstituted. The term "substituted" means that the group following this term possesses one or more moieties that have replaced one or more hydrogen radicals in any position within the group; non-limiting examples of moieties include halogen radicals (F, Cl, Br), hydroxyl groups, carbonyl groups, carboxyl groups, amine groups, phosphine groups, alkoxy groups, phenyl groups, naphthyl groups, $C_1$ to $C_{10}$ alkyl groups, $C_2$ to $C_{10}$ alkenyl groups, and combinations thereof. Non-limiting examples of substituted alkyls and aryls include: acyl radicals, alkylamino radicals, alkoxy radicals, aryloxy radicals, alkylthio radicals, dialkylamino radicals, alkoxycarbonyl radicals, aryloxycarbonyl radicals, carbomoyl radicals, alkyl- and dialkyl-carbamoyl radicals, acyloxy radicals, acylamino radicals, arylamino radicals and combinations thereof.

As used herein, the term "oligomers" refers to an ethylene polymer of low molecular weight, e.g., an ethylene polymer with a weight average molecular weight (Mw) of about 2000 to 3000 daltons. Other commonly used terms for oligomers include "wax" or "grease". As used herein, the term "light-end impurities" refers to chemical compounds with relatively low boiling points that may be present in the various vessels and process streams within a continuous solution polymerization process; non-limiting examples include, methane, ethane, propane, butane, nitrogen, $CO_2$, chloroethane, HCl, etc.

A. Catalyst
The catalyst is defined by the formula:

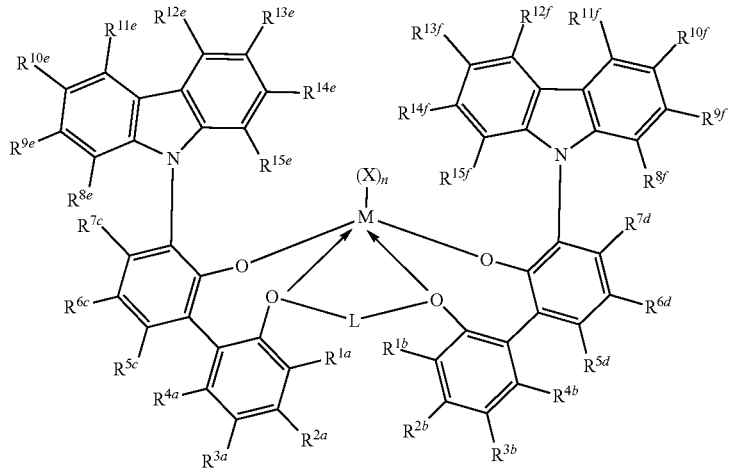

M is titanium, zirconium, or hafnium, each independently being in a formal oxidation state of +2, +3, or +4;

n is an integer of from 0 to 3, wherein when n is 0, X is absent;

Each X independently is a monodentate ligand that is neutral, monoanionic, or dianionic; or two X are taken together to form a bidentate ligand that is neutral, monoanionic, or dianionic;

X and n are chosen in such a way that the metal-ligand complex of formula (I) is, overall, neutral;

L is hydrocarbylene or heterohydrocarbylene, wherein the hydrocarbylene has a portion that includes a 1-carbon atom to 6-carbon atom linker backbone linking the O atoms in formula (I) and the heterohydrocarbylene has a portion that includes a 1-atom to 6-atom linker backbone linking the O atoms in formula (I), wherein each atom of the 1-atom to 6-atom linker backbone of the heterohydrocarbylene independently is a carbon atom or a heteroatom, wherein each heteroatom independently is O, S, S(O), S(O)$_2$, Si(R$^C$)$_2$, Ge(R$^C$)$_2$, P(R$^P$), or N(R$^N$), wherein independently each R$^C$ is unsubstituted (C1-C18)hydrocarbyl or the two R$^C$ are taken together to form a (C2-C19)alkylene, each R$^P$ is unsubstituted (C1-C18)hydrocarbyl; and each R$^N$ is unsubstituted (C1-C18)hydrocarbyl, a hydrogen atom or absent;

Each of R$^{1a}$, R$^{1b}$, R$^{2a}$, R$^{2b}$, R$^{3a}$, R$^{3b}$, R$^{4a}$, R$^{4b}$, R$^{5b}$, R$^{5d}$, R$^{6c}$, R$^{6d}$, R$^{7c}$, R$^{7d}$, R$^{8e}$, R$^{8f}$, R$^{9e}$, R$^{9f}$, R$^{10e}$, R$^{10f}$, R$^{11e}$, R$^{11f}$, R$^{12e}$, R$^{12f}$, R$^{13e}$, R$^{13f}$, R$^{14e}$, R$^{14f}$, R$^{15e}$, R$^{15f}$ independently is a hydrogen atom; hydrocarbyl; heterohydrocarbyl; or halogen atom.

In an embodiment, the catalyst is defined by the formula:

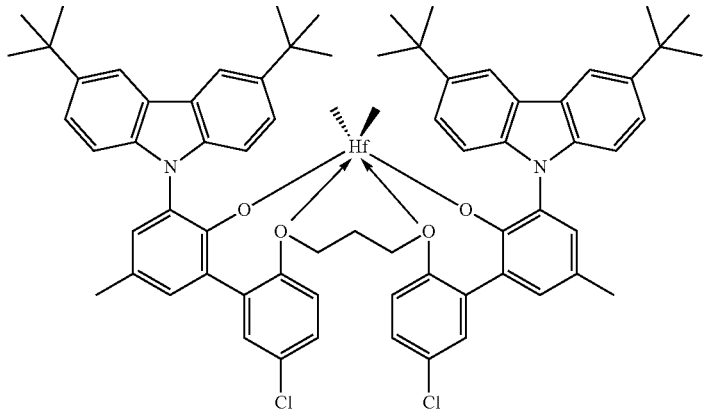

B. Cocatalyst (Also Known as "Activator")

The catalyst is rendered catalytically active by contacting it to, or combining it with, the activating co-catalyst or by using an activating technique such as those that are known in the art for use with metal-based olefin polymerization reactions. Suitable activating co-catalysts for use herein include alkyl aluminums; polymeric or oligomeric aluminoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Aluminoxanes and their preparations are known at, for example, U.S. Pat. No. 6,103,657. Examples of polymeric or oligomeric alumoxanes are methylalumoxane, triisobutylaluminum-modified methylalumoxane, and isobutylalumoxane.

Exemplary Lewis acid activating co-catalysts are Group 13 metal compounds containing from 1 to 3 hydrocarbyl substituents as described herein. In some embodiments, exemplary Group 13 metal compounds are tri(hydrocarbyl)-substituted-aluminum or tri(hydrocarbyl)-boron compounds. In some other embodiments, exemplary Group 13 metal compounds are tri(hydrocarbyl)-substituted-aluminum or tri(hydrocarbyl)-boron compounds are tri(($C_1$-$C_{10}$) alkyl)aluminum or tri(($C_6$-$C_{18}$)aryl)boron compounds and halogenated (including perhalogenated) derivatives thereof. In some other embodiments, exemplary Group 13 metal compounds are tris(fluoro-substituted phenyl)boranes, in other embodiments, tris(pentafluorophenyl)borane. In some embodiments, the activating co-catalyst is a tris(($C_1$-$C_{20}$) hydrocarbyl) borate (e.g., trityl tetrafluoroborate) or a tri(($C_1$-$C_{20}$)hydrocarbyl)ammonium tetra(($C_1$-$C_{20}$)hydrocarbyl)borane (e.g., bis(octadecyl)methylammonium tetrakis(pentafluorophenyl)borane). As used herein, the term "ammonium" means a nitrogen cation that is a (($C_1$-$C_{20}$) hydrocarbyl)$_4$N$^+$, a (($C_1$-$C_{20}$)hydrocarbyl)$_3$N(H)$^+$, a (($C_1$-$C_{20}$)hydrocarbyl)$_2$N(H)$_2^+$, ($C_1$-$C_{20}$)hydrocarbylN(H)$_3^+$, or N(H)$_4^+$, wherein each ($C_1$-$C_{20}$)hydrocarbyl may be the same or different.

Exemplary combinations of neutral Lewis acid activating co-catalysts include mixtures including a combination of a tri(($C_1$-$C_4$)alkyl)aluminum and a halogenated tri(($C_6$-$C_{18}$) aryl)boron compound, especially a tris(pentafluorophenyl) borane. Other exemplary embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Exemplary embodiments ratios of numbers of moles of (metal-ligand complex): (tris(pentafluorophenylborane):(alumoxane) [e.g., (Group 4 metal-ligand complex):(tris(pentafluorophenylborane):(alumoxane)] are from 1:1:1 to 1:10:30, other exemplary embodiments are from 1:1:1.5 to 1:5:10.

Many activating co-catalysts and activating techniques have been previously taught with respect to different metal-ligand complexes in the following patents: U.S. Pat. Nos. 5,064,802 and 5,198,401.

In some embodiments, the catalyst may be activated to form an active catalyst composition by combination with one or more cocatalyst such as a cation forming cocatalyst, a strong Lewis acid, or a combination thereof suitable cocatalysts for use include polymeric or oligomeric aluminoxanes, especially methyl aluminoxane, as well as inert, compatible, noncoordinating, ion forming compounds. Exemplary suitable cocatalysts include, but are not limited to modified methyl aluminoxane (MMAO), bis(hydrogenated tallow alkyl)methyl, tetrakis(pentafluorophenyl)borate(1-) amine, triethyl aluminum, and any combinations thereof.

In some embodiments, one or more of the foregoing activating co-catalysts are used in combination with each other. One combination is a mixture of a tri(($C_1$-$C_4$)hydrocarbyl)aluminum, tri(($C_1$-$C_4$)hydrocarbyl)borane, or an ammonium borate with an oligomeric or polymeric alumoxane compound.

In some embodiments, the ratio of total number of moles of one or more metal-ligand complexes of formula (I) to total number of moles of one or more of the activating co-catalysts is from 1:10,000 to 1:100. In some embodiments, the ratio is at least 1:5000, in some other embodiments, at least 1:1000; and 1:10 or less, and in some other embodiments, 1:1 or less. When an alumoxane alone is used as the activating co-catalyst, in some embodiments the number of moles of the alumoxane that are employed is at least 100 times the number of moles of the metal-ligand complex of formula (I). When tris(pentafluorophenyl)borane alone is used as the activating co-catalyst, in some other embodiments, the number of moles of the tris(pentafluorophenyl)borane that are employed to the total number of moles of one or more metal-ligand complexes of formula (I) form 0.5:1 to 10:1, in some other embodiments, from 1:1 to 6:1, in some other embodiments, from 1:1 to 5:1. The remaining activating co-catalysts are generally employed in approximately mole quantities equal to the total mole quantities of the catalyst.

In an embodiment, the activator includes a boron ionic activator and an alumoxane.

In an embodiment, the activator includes a boron ionic activator and an alumoxane wherein the mole ratio of boron contained in said boron ionic activator to the hafnium contained in said catalyst is from 1:1 to 2:1 and the mole ratio of aluminum contained in said alumoxane to the hafnium contained in said catalyst is from 5:1 to 1000:1.

Solvent

A variety of solvents may be used as the process solvent; non-limiting examples include linear, branched or cyclic $C_5$ to $C_{12}$ alkanes. It is well known to individuals of ordinary experience in the art that reactor feed streams (solvent, monomers, α-olefin, hydrogen, catalyst formulation etc.) should be essentially free of catalyst deactivating poisons; non-limiting examples of poisons include trace amounts of oxygenates such as water, fatty acids, alcohols, ketones and aldehydes. Such poisons are removed from reactor feed streams using standard purification practices; non-limiting examples include molecular sieve beds, alumina beds and oxygen removal catalysts for the purification of solvents, ethylene.

Additives

The copolymers according to this disclosure may contain additives. Non-limiting examples of additives and adjuvants include, anti-blocking agents, antioxidants, heat stabilizers, slip agents, processing aids, anti-static additives, colorants, dyes, filler materials, light stabilizers, light absorbers, lubricants, pigments, plasticizers, and combinations thereof.

Solution Polymerization Process and Comonomers

Solution polymerization processes are known in the art. These processes are conducted in the presence of an inert hydrocarbon solvent for example a $C_{5-12}$ hydrocarbon which may be unsubstituted or substituted by $C_{1-4}$ alkyl group, such as pentane, hexane, heptane, octane, cyclohexane, methylcyclohexane and hydrogenated naphtha. An additional solvent is Isopar E ($C_{8-12}$ aliphatic solvent, Exxon Chemical Co.).

The polymerization may be conducted at temperatures from about 80° C. to about 250° C. Depending on the product being made this temperature may be relatively low such as from 80° C. to about 180° C. for some of the ethylene propylene polymers and ethylene diene monomer polymers, to temperatures from about 120° C. to about 250° C. for the more convention polyethylenes, and copolymers of ethylene and styrene.

A solution polymerization may be conducted under pressures of form 100 to 4500 psig (0.7 to 31 MPa). However, the process of this disclosure uses a pressure of at least 10.3 MPa.

Suitable olefin comonomers may be ethylene and $C_{3-20}$ mono- and di-olefins. Example comonomers include ethylene and $C_{3-12}$ alpha olefins which are unsubstituted or substituted by up to two $C_{1-6}$ alkyl radicals, $C_{8-12}$ vinyl aromatic monomers which are unsubstituted or substituted by up to two substituents chosen from $C_{1-4}$ alkyl radicals, $C_{4-12}$ straight chained or cyclic diolefins which are unsubstituted or substituted by a $C_{1-4}$ alkyl radical. Illustrative non-limiting examples of such alpha-olefins are one or more of propylene, 1-butene, 1-pentene, 1-hexene, 1-octene, and 1-decene, styrene, alpha methyl styrene, p-t-butyl styrene, and the constrained-ring cyclic olefins such as cyclobutene, cyclopentene, dicyclopentadiene norbornene, alkyl-substituted norbornes, alkenyl-substituted norbornes and the like (e.g. 5-methylene-2-norbornene and 5-ethylidene-2-norbornene, bicyclo-(2,2,1)-hepta-2,5-diene).

The polyethylene polymers which may be prepared in accordance with the present disclosure for example include not less than 60, for example not less than 70 weight % of ethylene and the balance one or more $C_{4-10}$ alpha olefins, for example chosen from 1-butene, 1-hexene and 1-octene. The polyethylene prepared in accordance with the present disclosure may be linear low density polyethylene having a density from about 0.910 to 0.935 g/cc or (linear) high density polyethylene having a density above 0.935 g/cc. The present disclosure might also be useful to prepare polyethylene having a density below 0.910 g/cc—the so-called very low and ultra low density polyethylenes.

The present disclosure may also be used to prepare co- and ter-polymers of ethylene, propylene and optionally one or more diene monomers. In some embodiments, such polymers will contain about 50 to about 75 weight % ethylene, for example about 50 to 60 weight % ethylene and correspondingly from 50 to 25 weight % of propylene. A portion of the monomers, for example the propylene monomer, may be replaced by a conjugated diolefin. The diolefin may be present in amounts up to 10 weight % of the polymer although typically is present in amounts from about 3 to 5 weight %. The resulting polymer may have a composition including from 40 to 75 weight % of ethylene, from 50 to 15 weight % of propylene and up to 10 weight % of a diene monomer to provide 100 weight % of the polymer. Preferred but not limiting examples of the dienes are dicyclopentadiene, 1,4-hexadiene, 5-methylene-2-norbornene, 5-ethylidene-2-norbornene and 5-vinyl-2-norbornene. Particularly preferred dienes are 5-ethylidene-2-norbornene and 1,4-hexadiene.

Other olefin polymers which may be prepared in accordance with the present disclosure may be determined by one of ordinary skill in the art using non-inventive testing.

The polymers prepared in accordance with the present disclosure have a good molecular weight. That is the molecular weight (Mn) will for example be greater than about 20,000 (for example between 25,000 and 125,000).

In a solution polymerization the monomers are dissolved/dispersed in the solvent either prior to being fed to the reactor, or for gaseous monomers the monomer may be fed to the reactor so that it will dissolve in the reaction mixture. Prior to mixing, the solvent and monomers are generally purified to remove polar moieties. The polar moieties, or catalyst poisons include water, oxygen, metal impurities, etc. In some embodiments, steps are taken before provision of such into the reaction vessel, for example by chemical treatment or careful separation techniques after or during the synthesis or preparation of the various components. The feedstock purification prior to introduction into the reaction solvent follows standard practices in the art, e.g. molecular sieves, alumina beds and oxygen removal catalysts are used for the purification of ethylene, alpha-olefin, and optional diene. The solvent itself as well (e.g. hexane and toluene) is similarly treated. In some instances, out of an abundance of caution excess scavenging activators may be used in the polymerization process.

The feedstock may be heated prior to feeding to the reactor. However, in many instances it is desired to remove heat from the reactor so the feed stock may be at ambient temperature to help cool the reactor.

In some embodiments, the catalyst components may be premixed in the solvent for the reaction or fed as separate streams to the reactor. In some instances, premixing is desirable to provide a reaction time for the catalyst components prior to entering the reaction. Such an "in line mixing" technique is described in a number of patents in the name of DuPont Canada Inc. For example, it is described in U.S. Pat. No. 5,589,555 issued Dec. 31, 1996.

The reactor system may include one or more reactors. It is well known to use two such reactors, in series, each of which may be operated so as to achieve different polymer molecular weight characteristics. The residence time in the reactor system will depend on the design and the capacity of the reactor and the flow rate of the solvent and monomer to the reactor. On leaving the reactor system the solvent is removed and the resulting polymer is recovered in a conventional manner.

The process of this disclosure enables from 70 to 95% of the ethylene that is fed to a reactor to be converted (polymerized) in a residence time (also known as Hold Up Time) of from 0.5 to 5 minutes. For clarity, this rate of conversion must be achieved in at least one reactor. However, if a second or more reactor is employed, it is not required (in all embodiments) to achieve this rate of reaction in all reactors.

EXAMPLES

Part 1: Chemicals and Common Procedures Handlings

Ethylene was purchased from Praxair as polymer grade. The ethylene was purified and dried by passing the gas through a series of purification beds including alumina, 13X molecular sieves, and a conventional deoxygenation bed.

Purchased 1-octene was dried by storing a 1-liter batch over molesieve 3A.

Methanol was purchased as GR ACS grade from EMD Chemicals.

Xylene was purchased from Univar. It was purified and dried by passing through a deoxygenation catalyst, alumina, and 3A and 13X molecular sieve beds).

Cylcohexane was purchased from Univar. It was purified and dried by passing through a deoxygenation catalyst, alumina beds, and 3A and 13X molecular sieve beds.

13x molecular sieves were purchased from Grace Davison and stored in general lab storage. Before being used as a drying agent, the molecular sieves were heated for 16 hours at 360° C. to activate them and were then pumped into a glovebox at full dynamic vacuum for at least 3 hours. 3A molsieves: Pellets were activated in the same manner.

Triphenylmethylcarbenium tetrakis(pentafluorophenyl) borate ["trityl borate"] was purchased from Albemarle and used without further purification.

Modified methylaluminoxane-7 (MMAO-7) was purchased as a 7 wt % solution in ISOPAR™ E from Akzo Nobel Polymer Chemicals. It was contained in a pyrosafe cylinder and used as received in a glovebox.

2,6-di-tert-butyl-4-ethylphenol (BHEB) was purchased as a 99% pure compound and used without further purification.

The catalyst was made using techniques generally known to those skilled in the art and also disclosed in U.S. Patent Application 20150337062 (Demirors et al.; to Dow Global).

Part 2: Polymerization and Polymer Characterizations

All the polymerization experiments described below were conducted using a continuous solution polymerization reactor. The process is continuous in all feed streams (solvent, monomers and catalyst) and in the removal of product. All feed streams were purified prior to the reactor by contact with various absorption media to remove catalyst killing impurities such as water, oxygen and polar materials as is known to those skilled in the art. All components were stored and manipulated under an atmosphere of purified nitrogen.

All the examples below were conducted in a reactor of 71.5 cc internal volume. In each experiment the volumetric feed to the reactor was kept constant and as a consequence so was the reactor residence time.

The catalyst solutions were pumped to the reactor independently and there was no pre-contact between the activator and the catalyst. Because of the low solubility of the catalysts, activators and MAO in cyclohexane, solutions were prepared in toluene. The catalyst was activated in situ (in the polymerization reactor) at the reaction temperature in the presence of the monomers. The polymerizations were carried out in cyclohexane at a pressure of 10.3 MPa. Ethylene was supplied to the reactor by a calibrated thermal mass flow meter and was dissolved in the reaction solvent prior to the polymerization reactor. If comonomer was used it was also premixed with the ethylene before entering the polymerization reactor. Under these conditions the ethylene conversion is a dependent variable controlled by the catalyst concentration, reaction temperature and catalyst activity.

The internal reactor temperature is monitored by a thermocouple in the polymerization medium and can be controlled at the required set point to +/−0.5° C. Downstream of the reactor the pressure was reduced from the reaction pressure 10.3 MPa to atmospheric pressure. The solid polymer was then recovered as a slurry in the condensed solvent and was dried in vacuum oven before analysis.

The ethylene conversion was determined by a dedicated on-line gas chromatograph. The average polymerization rate constant Kp was calculated based on the reactor hold-up time, the catalyst concentration and the ethylene conversion and is expressed in l/(mmol*min).

$$Kp = (Q/(100-Q)) \times (1/TM) \times (1/HUT)$$

where:
Q = the percent ethylene conversion
TM = the reactor catalyst concentration in mM
HUT = the reactor hold-up time in minutes Polymerization results are shown in Table 1.

Polymer Analysis

GPC analysis was carried out using a Waters 150C GPC using 1,2,4-trichlorobenzene as the mobile phase at 140° C. The samples were prepared by dissolving the polymer in the mobile phase solvent in an external oven at 0.1% (w/v) and were run without filtration. Molecular weights are expressed as polyethylene equivalents with a relative standard deviation of 2.9% and 5.0% for the number average (Mn) and weight average (Mw) respectively. Poly dispersity ("PD") is Mw/Mn.

Polymer branch frequencies (SBr) were determined by Fourier Transform Infra Red spectroscopy using a spectrophotometer sold under the name Nicolet 750 Magna-IR.

TABLE 1

Catalyst Activity and Polymer Molecular Weight Under Varying Process Conditions

| Run # | Reactor Temperature (° C.) | C2 g/l | C8/C2 (wt/wt) | Q (%) | Kp (1/mM*min) | Mw ($10^{-3}$) | PD | SBr/ 1000 C. | Catalyst uM | Al/Hf |
|---|---|---|---|---|---|---|---|---|---|---|
| 1 | 220 | 160 | 0.3 | 89.62 | 677 | 132.4 | 2.3 | 14.6 | 4.9 | 4.1 |
| 2 | 220 | 180 | 0.3 | 89.66 | 463 | 123.0 | 2.0 | 14.9 | 7.2 | 2.8 |
| 3 | 190 | 130 | 0.3 | 90.20 | 1826 | 203.3 | 2.1 | 15.4 | 1.9 | 10.3 |
| 4 | 190 | 180 | 0.3 | 90.52 | 620 | 154.1 | 2.2 | 13.9 | 5.9 | 3.4 |
| 5 | 160 | 100 | 0.3 | 90.58 | 10682 | 326.6 | 2.3 | 16.7 | 0.35 | 57.8 |
| 6 | 160 | 100 | 0.3 | 90.28 | 6449 | 297.1 | 2.3 | 17.1 | 0.56 | 36.1 |
| 7 | 160 | 100 | 0.5 | 89.57 | 5962 | 295.4 | 2.3 | 27.8 | 0.56 | 53.9 |
| 8 | 160 | 100 | 0.7 | 89.45 | 5887 | 263.6 | 2.3 | 35.8 | 0.56 | 36.1 |

C2 = ethylene
C8 = octene

The total flow of solvent and ethylene was 27.5 ml per minute which provides hold up times (HUT) of between 2.1 minutes (for the ethylene flow rate of 75 grams of ethylene per liter of feed) and 1.9 minutes (for the ethylene flow rate of 120 grams of ethylene per liter of feed).

The catalyst used in all examples is described by the following formula:

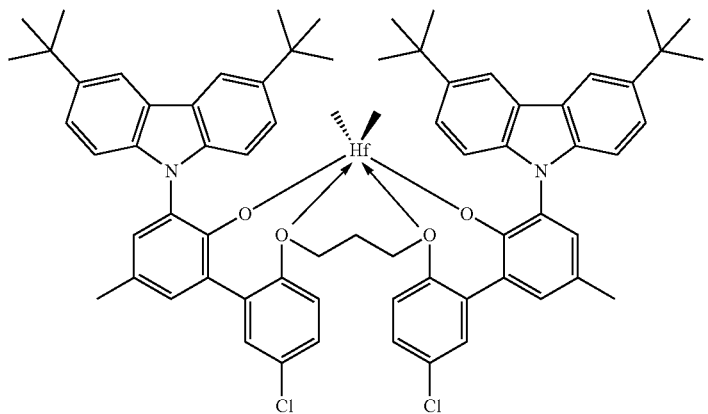

The catalyst was activated with methylalumoxane (MAO) and trityl borate. The reactor catalyst concentration (expressed as uM of Hf) is shown in Table 1, as is the Al/Hf mole ratio. Trityl borate was used in a B:Hf mole ratio of 1:2/1 in all experiments. BHEB was also used at a mole ratio (BHEB:Al) of 0.3:1 in all experiments.

INDUSTRIAL APPLICABILITY

The copolymerization of ethylene and comonomer(s) is disclosed. The resulting polymers are suitable for the preparation of a wide variety of goods including plastic toys; plastic parts and profiles and plastic films.

The invention claimed is:

1. A process for the (co)polymerization of ethylene and, optionally, at least one $C_3$ to $C_{10}$ alpha olefin comonomer wherein said process is conducted under solution polymerization conditions using a catalyst system comprising:

A) a catalyst defined by the formula:

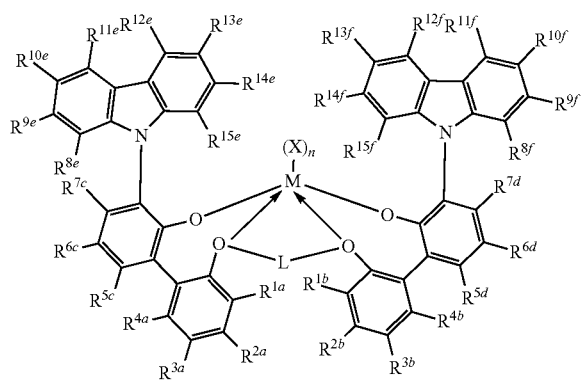

M is titanium, zirconium, or hafnium, each independently being in a formal oxidation state of +4;
n is 2;
Each X independently is a monodentate ligand;
X is chosen in such a way that the metal-ligand complex of formula (I) is, overall, neutral;
L is hydrocarbylene or heterohydrocarbylene, wherein the hydrocarbylene has a portion that comprises a 1-carbon atom to 6-carbon atom linker backbone linking the O atoms in formula (I) and the heterohydrocarbylene has a portion that comprises a 1-atom to 6-atom linker backbone linking the O atoms in formula (I), wherein each atom of the 1-atom to 6-atom linker backbone of the heterohydrocarbylene independently is a carbon atom or a heteroatom, wherein each heteroatom independently is O, S, S(O), S(O)$_2$, Si(R$^C$)$_2$, Ge(R$^C$)$_2$, P(R$^P$), or N(R$^N$), wherein independently each R$^C$ is unsubstituted (C1-C18)hydrocarbyl or the two R$^C$ are taken together to form a (C2-C19)alkylene, each R$^P$ is unsubstituted (C1-C18)hydrocarbyl; and each R$^N$ is unsubstituted (C1-C18)hydrocarbyl, a hydrogen atom or absent;

Each of R$^{1a}$, R$^{1b}$, R$^{2a}$, R$^{2b}$, R$^{3a}$, R$^{3b}$, R$^{4a}$, R$^{4b}$, R$^{5b}$, R$^{5d}$, R$^{6c}$, R$^{6d}$, R$^{7c}$, R$^{7d}$, R$^{8e}$, R$^{8f}$, R$^{9e}$, R$^{9f}$, R$^{10e}$, R$^{10f}$, R$^{11e}$, R$^{11f}$, R$^{12e}$, R$^{12f}$, R$^{13e}$, R$^{13f}$, R$^{14e}$, R$^{14f}$, R$^{15e}$, R$^{15f}$ independently is a hydrogen atom; hydrocarbyl; heterohydrocarbyl; or halogen atom;

and B) an activator, wherein said solution polymerization is conducted under the following conditions:
1) an ethylene feed concentration of from 70 to 200 grams per liter of feed solvent;
2) a pressure of from 10.3 to 31 MPa;
3) a reactor residence time of from 0.5 to 5 minutes, with the proviso that from 50 to 95 weight % of the ethylene in said feed is converted to polymer within said residence time of from 0.5 to 5 minutes.

2. The process of claim 1 wherein said L is hydrocarbylene and comprises a 1-carbon atom to 6-carbon atom linker.

3. The process of claim 1 wherein said at least one $C_3$ to $C_{10}$ comonomer is chosen from propylene; 1-butene; 1-hexene and or 1-octene.

4. The process of claim 1 wherein said activator comprises a boron ionic activator.

5. The process of claim 1 wherein said activator comprises a boron ionic activator and an alumoxane.

6. The process of claim 1 wherein said M is hafnium.

7. The process of claim 6 wherein said activator comprises a boron ionic activator and an alumoxane.

8. The process of claim 7 wherein a mole ratio of boron in said boron ionic activator to the hafnium in said catalyst is from 1:1 to 2:1 and a mole ratio of aluminum in said alumoxane to the hafnium in said catalyst is from 2:1 to 1000:1.

* * * * *